May 28, 1963 J. J. AUSTIN 3,091,253
FLOAT-CONTROLLED VALVE FOR POULTRY-WATERING
APPARATUS AND THE LIKE
Filed Nov. 6, 1961 2 Sheets-Sheet 1

INVENTOR.
JOHN J. AUSTIN
BY
Kenway, Jenney & Hildreth
ATTORNEYS

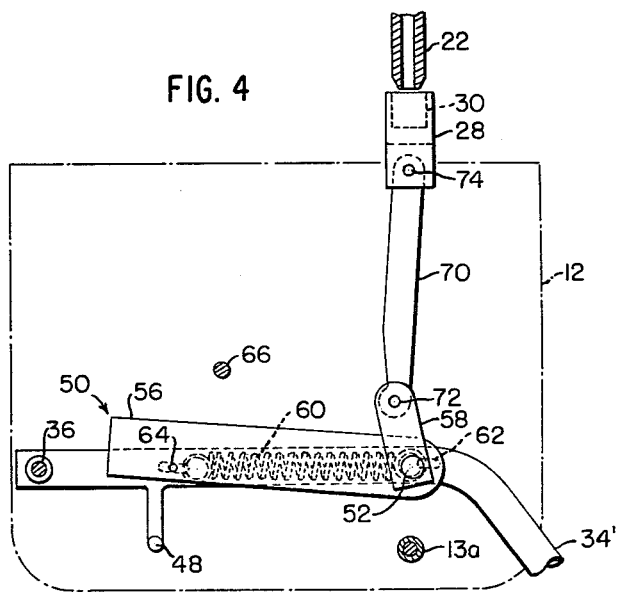
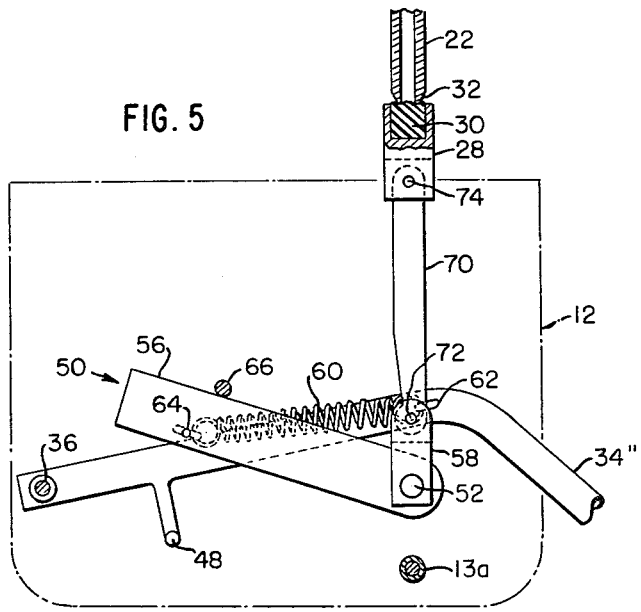

United States Patent Office 3,091,253
Patented May 28, 1963

3,091,253
FLOAT-CONTROLLED VALVE FOR POULTRY-WATERING APPARATUS AND THE LIKE
John J. Austin, Box 187, Topsfield, Mass.
Filed Nov. 6, 1961, Ser. No. 150,553
5 Claims. (Cl. 137—418)

This invention relates to an improved float-controlled valve which has particular utility for maintaining a desired water level in poultry-watering apparatus, but may also be used in other apparatus such as carburetors, toilets, and various other devices in which a supply of liquid is to be replenished upon its reduction to a given level.

Float valves which open and close slowly against substantial fluid supply pressures are subject to rapid valve seat wear. After a moderate amount of use they may tend to run continuously, and require frequent adjustment or replacement of sealing elements.

It is an object of the present invention to provide an improved float-controlled valve which operates reliably with a minimum of maintenance and affords long service. It is another object of the invention to provide an improved float-controlled valve which opens and closes fully and quickly with a positive snap action. Further objects and advantages of the invention will become apparent as the following description proceeds.

Briefly stated, according to a preferred embodiment of the invention, I provide a float-controlled valve in which a pivotally-mounted bell crank including two arms forms a portion of two toggle linkages. A first toggle linkage includes a pivotally-mounted stem bearing a float, and a tension spring connecting the stem with one arm of the bell crank, for movement of the linkage with a snap action to either side of the common centerline of the fixed pivot points of the stem and the bell crank. A second toggle linkage includes a valve member reciprocably supported in a valve housing for sliding movement along a second centerline passing through the pivot point of the bell crank. A link pivotally connects the valve member with a second arm of the bell crank. The linkages are so arranged that in a position of the first linkage below the centerline of its fixed pivot points, i.e. when the float is in a lowered position, the second linkage is in an off-center relationship opening the valve; and in a position of the first linkage above the centerline of its fixed pivot points, i.e. when the float is in a raised position, the second toggle linkage is rectilinearly arranged on the second centerline thus positively locking the valve in a closed position against a fluid supply pressure.

It is a feature of this valve arrangement that the tension spring biases the float downwardly in a below-center position of the first toggle linkage, so that when the valve opens, the level of fluid in the associated reservoir must reach a relatively high level with respect to the float before the net upward force raises the float sufficiently to over-balance the linkage to close the valve. Thus the reservoir is filled to a relatively high level. However, the tension spring biases the float upwardly in an above-center relationship of the first toggle linkage, with the result that the level of the water in the reservoir must reach a relatively low level with respect to the float before the net downward force depresses the float sufficiently to over-balance the linkage to open the valve. Consequently, the reservoir may be substantially emptied of water before being refilled by the float valve with a clean fresh supply. Mixing of fresh water with a large quantity of water which has been dirtied by poultry is undesirable and unsanitary, and this problem is overcome by the improved valve. Furthermore, the valve arrangement affords an extremely rapid snap action when opening or closing, so that wear of the valve seat is reduced to a minimum, and long maintenance-free service is secured.

The improved valve may include latching means for securing the stem of the float in a raised position to lock the valve closed for removal and cleaning of the pan or reservoir. Additional features of the invention, and a clearer understanding thereof, may be gained from the following detailed description of a preferred embodiment, referring to the accompanying drawings, in which:

FIG. 4 is a fragmentary view in elevation showing the valve linkage in a centered or neutral relationship; and FIG. 5 is a view similar to FIG. 4, but showing the valve linkage in a valve-closing relationship.

Figure 3:
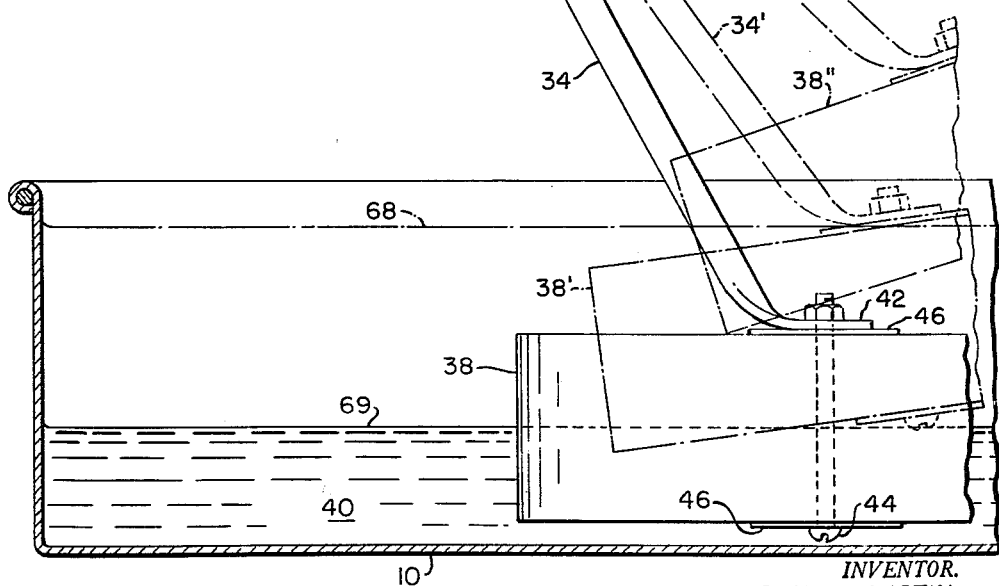
FIG. 3 is a sectional view taken along line 3—3 in FIG. 1 looking in the direction of the arrows.
Figure 3:
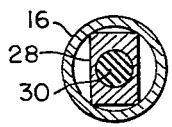

Referring to the drawings, the improved valve is shown in operative relation to a shallow pan or reservoir 10 particularly adapted for watering domestic animals or poultry. The valve mechanism is organized about a U-shaped casing 12, joined by its open end by a threaded fastener 13 bearing a spacer 13a. The casing is supported in overhanging relation to the pan by means of an inlet tube 16 which has thereon threads 15 which engage a water supply pipe 17. The water inlet tube 16 is adjustably mounted outside the casing 12 on one side wall by means of a bracket 18 secured by threaded fasteners 20, for convenient adjustment of the vertical position of the tube 16 relative to the valve mechanism. In a poultry watering device, it is convenient to provide a restrictive flow orifice by mounting a nipple 22 in a ring 24 soldered in the inlet tube 16, although the particular form of inlet is not critical to the practice of the invention. A valve member 28 of rectangular cross section (FIG. 3) is slidably received in the tube 16, and bears a resilient insert 30 for engagement with a valve seat 32 formed at the tip of the nipple 22 to interrupt the flow of water.

The valve mechanism includes a stem 34 which is pivotally supported in the casing 12 upon a transverse screw or pin 36, and is curved sharply downward to extend a float 38 into the pan 10 for floatation in a body of water 40 contained therein. The float is formed of any desired buoyant material, and is secured to a flattened end 42 of the stem by a threaded fastener 44 and washers 46. Near its pivoted end, the stem is formed with a transverse limiting stop 48 for a purpose to be hereinafter described.

A bell-crank 50 is pivotally supported by means of a pin 52 on one wall of a boss 54 formed in the casing, and includes an interior arm 56 extending interiorly of the casing, and an extension arm 58 extending exteriorly thereof, the arms having a predetermined angular relationship.

A tension spring 60 has its opposite ends linked in an opening 62 in the stem 34, and at 64 in the interior arm 56 of the bell-crank. It will be apparent that in the position shown in solid lines in FIG. 1, that is with the float 38 depressed, the spring 60 biases the bell-crank 50 and the stem 34 downwardly about their respective pivot points, thus forcing the float below its level of normal floatation in the pan. In a juxtaposition of the elements as shown in FIG. 5, the spring urges the bell-crank and stem upwardly; and in a position shown in FIG. 4 (which occurs only transitorily) in which the center line of the spring coincides with the center line connecting the pivot points at the pins 36 and 52, the bias is neutral. The spacer 13a and the limiting stop 48 restrict the downward movement of the stem 34 and the bell-crank 50, respectively to the positions shown in FIG. 1, and a limiting stop 66 restricts the upward movement of the bell-crank to the position shown in FIG. 5. The neutral or central position of the linkage corresponds to positions 34′, 38′ of the stem and float, and the above-center position corresponds to positions 34″ and 38″ of the stem and the float, respectively.

Figure 1:
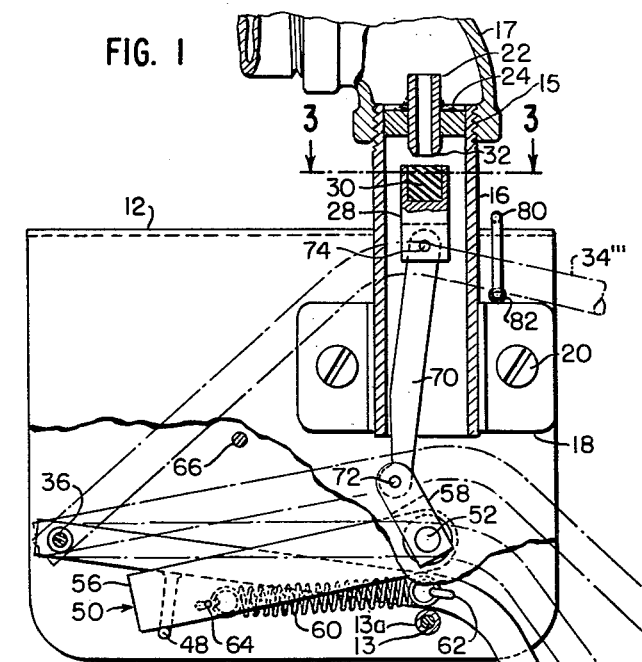
FIG. 1 is a fragmentary view in elevation and partially in section of a preferred embodiment of the valve, shown in an open position and associated with a poultry watering pan.
Figure 2:
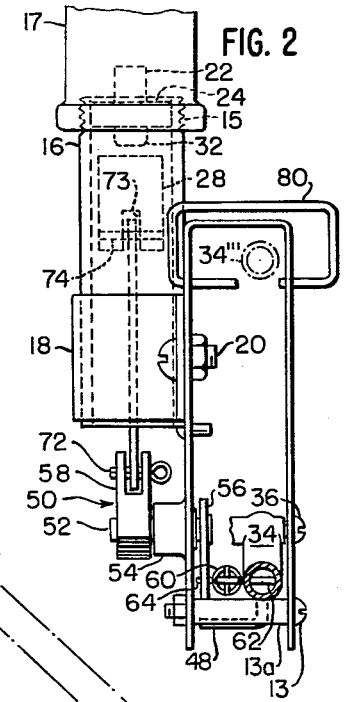
FIG. 2 is a fragmentary view in side elevation of the valve mechanism.

The interior arm 56 of the bell-crank, the stem 34, and the spring 60 thus cooperate to form a first toggle linkage which is actuable over-center to the alternate positions of FIG. 1 or FIG. 5 with a rapid snap action. It is to be noted that in the above-center position of the linkage, the spring 60 biases the float upwardly, so that it will rest in the water above its normal floatation level. Correspondingly, in a below-center position of the linkage, the float is biased downwardly, and will rest in the water below its normal level. The linkage is so arranged that upon an approach of the float from either direction toward the centered position 38′, a critical position is attained in which the stem snaps the bell-crank over-center to actuate the valve correspondingly to an open or closed position. The bias of the float in opposite senses in the below-center and above-center juxtapositions of the toggle linkage causes the valve, when opened, to remain open until the pan 10 is filled to a relatively high level 68, and when closed, to remain closed until the water has drained to a relatively low level 69. Thus, a very small quantity of dirty water is allowed to remain in the pan at the time it is refilled with fresh water.

The second arm 58 of the bell-crank is drivingly connected with the valve member 28 by means of a link 70, pivotally connected to the arm by a cotter pin 72, and to the base of the valve member by a pin 74, to form a second toggle linkage. The angular relationship between the arms 58 and 56 of the bell-crank is so established that in the uppermost position of the arm 56 shown in FIG. 5, the pin 72 falls on the center line of the pins 52 and 74; thus the linkage formed by the link 70 and the arm 58 is locked in a rectilinear relationship. In this position, the resilient valve insert 30 is seated firmly upon the valve seat 32 of the nipple 22 to positively seal the inlet against flow into the tank, and is locked against leakage which the water pressure tends to induce.

In operation, assuming that the pan 10 has initially been filled to the higher level 68, the linkages are in the valve-closing position of FIG. 5. The float is biased upwardly by the spring 60, and does not approach the position 38′ until the water has fallen to the lower level 69. At this time, the stem carries the bell-crank over-center, the bell-crank passing through the centered position of FIG. 4 with a rapid snap action to the position shown in FIG. 1, opening the valve to refill the pan. In this position, the spring 60 biases the float downwardly, so that it does not approach the position 38′ until the water has reached the higher level 68. The limiting stop 48 urges the arm 56 upwardly as the float rises. As the level 68 is attained, the stem approaches the centered position, and the bell-crank passes with a snap action over-center to the position of FIG. 5 to close the valve quickly.

In order to lock the valve in a closed position for removal of the pan, as during a cleaning operation, the stem may be raised to another position 34‴ and secured by a slidable latch 80, which is received in transverse openings 82 formed in the walls of the casing. This movement affects the valve linkage only by increasing the tension of the spring 60.

The mounting of the tube 16 for vertical sliding adjustment in the bracket 18 renders adjustment of the valve to secure firm sealing engagement between the valve seat 32 and the valve member quite easy to carry out without special tools.

Various changes and modifications will readily occur to those skilled in the art without departing from the true spirit and scope of the invention, which I intend to define in the appended claims without limitation to specific details of the preferred embodiment herein described by way of illustration.

What I claim is:

1. A snap-acting float-controlled valve comprising, in combination; a U-shaped valve casing, a fluid inlet pipe terminating in a valve seat and adjustably secured to the exterior of the casing, a valve member slidably mounted in said inlet pipe for reciprocation along a center line for selective engagement with said valve seat to close said inlet, a bell-crank pivotally mounted on said center line in said casing and having an interior arm inside said casing and an exterior arm outside said casing, a link pivotally connecting said valve member with said exterior arm, a stem pivotally mounted on said casing, a float carried by said stem, a tension spring connected at its opposite ends to said stem and to said interior arm, said spring being arranged upon lowering of said stem to snap said bell-crank to a first position to withdraw said valve member from said seat, and upon raising of said stem to snap said bell-crank to a second position to extend said exterior arm and said link rectilinearly along said center line to lock said member in sealing engagement with said seat.

2. A float-controlled valve comprising, in combination; a valve casing, a fluid inlet pipe terminating in a valve seat and adjustably secured to the exterior of said casing, a valve member slidably mounted in said inlet pipe for reciprocation along a first center line to selectively engage with said valve seat to close said inlet, a bell-crank pivotally mounted on said first center line in said casing and having an interior arm inside said casing and an exterior arm outside said casing, a link pivotally connecting said valve member with said exterior arm of said bell-crank, a stem pivotally mounted in said casing on a second center line passing through the pivot point of said bell-crank, a float secured to said stem, a tension spring in the casing connecting said stem with said interior arm for biasing said interior arm across said second center line with a snap action to a first position upon elevation of said stem above said second center line, and to a second position upon depression of said stem below said second center line, said valve member closing said inlet in said first position and opening said inlet in said second position.

3. A snap-acting float-controlled valve comprising, in combination; a valve casing, a fluid inlet pipe terminating in a valve seat and adjustably secured to the exterior of said casing, a valve member slidably mounted in said inlet pipe for reciprocation along a first center line for selective engagement with said valve seat to close said inlet, a bell-crank having pivotally mounted on said first center line in said casing and having an interior arm inside said casing and an exterior arm outside said casing, a link pivotally connecting said valve member with said exterior arm, a stem pivotally mounted on said casing, a float carried by said stem, a tension spring connected at its opposite ends to said stem and to said interior arm, said stem and said interior arm being movable across a second center line connecting their pivot points with a snap action induced by said spring to a first position in which said valve member is withdrawn from said seat and said float is in a depressed position, and to a second position in which said exterior arm and said link extend rectilinearly along said first center line to lock said valve member in sealing engagement with said seat and said float is in an elevated position, said spring biasing said float downwardly in said first position, and upwardly in said second position, of said stem and said interior arm.

4. A snap-acting float-controlled valve comprising, in combination: a valve casing forming a fluid inlet; a valve member slidably mounted upon the exterior of said casing for reciprocation to selectively open and close said inlet; a float; a first and second toggle linkages operatively connecting said float with said valve member; said first linkage comprising a stem secured to said float and a first arm pivotally supported at a pivot point spaced from the pivot point of said stem, and a tension spring connecting said stem with said first arm for over-center snap action to a first depressed position of said float and to a second elevated position of said float; said second linkage comprising a second arm affixed to said first arm, and a link pivotally connecting said second arm with said valve member; said second linkage being arranged to open said valve in said first position, and extending rectilinearly in said second position to close said valve.

5. A snap-acting float-controlled valve comprising in combination: a valve casing, a fluid inlet pipe; a valve member slidably mounted in said inlet pipe for reciprocation to selectively open and close said inlet; a float; and first and second toggle linkages operatively connecting said float with said valve member; said first linkage comprising a stem secured to said float and pivotally supported at a pivot point in said casing, an interior arm pivotally supported in said casing at a pivot point spaced from the pivot point of said stem, and a tension spring connecting said stem with said interior arm for snap action of said interior arm across a center line connecting the pivot points of said stem and said interior arm to a first depressed position of said float and to a second elevated position of said float, said spring biasing said float downwardly in said first position and upwardly in said second position; stop means for terminating angular movement of said interior arm in said first and second positions; said second toggle linkage comprising an exterior arm affixed to said interior arm, and a link pivotally connecting said exterior arm with said valve member; said second toggle linkage being arranged to open said valve in said first position, and extending rectilinearly in said second position to close said valve.

References Cited in the file of this patent
UNITED STATES PATENTS

| | | |
|---|---|---|
| 606,404 | Burnett | June 28, 1898 |
| 1,720,919 | Nesbitt | July 16, 1929 |
| 1,904,793 | Lauoie | Apr. 18, 1933 |

FOREIGN PATENTS

| | | |
|---|---|---|
| 1,223,714 | France | Feb. 1, 1960 |